United States Patent
Bourke

(10) Patent No.: US 10,089,098 B2
(45) Date of Patent: *Oct. 2, 2018

(54) SYSTEMS AND METHODS FOR APPLICATION INSTALLATION PLATFORMS

(71) Applicant: SweetLabs, Inc., San Diego, CA (US)

(72) Inventor: Adrian Bourke, San Diego, CA (US)

(73) Assignee: SweetLabs, Inc., San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/426,986

(22) Filed: Feb. 7, 2017

(65) Prior Publication Data

US 2017/0147318 A1 May 25, 2017

Related U.S. Application Data

(63) Continuation-in-part of application No. 14/714,095, filed on May 15, 2015.

(60) Provisional application No. 61/994,033, filed on May 15, 2014.

(51) Int. Cl.
*G06F 8/61* (2018.01)
*H04L 29/08* (2006.01)
(Continued)

(52) U.S. Cl.
CPC ............ *G06F 8/61* (2013.01); *G06Q 30/0253* (2013.01); *H04L 67/303* (2013.01);
(Continued)

(58) Field of Classification Search
None
See application file for complete search history.

(56) References Cited

U.S. PATENT DOCUMENTS 5,021,949 A 6/1991 Morten et al.
5,548,704 A 8/1996 Steiner et al.
(Continued)

FOREIGN PATENT DOCUMENTS

CN 1322325 A 11/2001
EP 3090357 A1 11/2016
(Continued)

OTHER PUBLICATIONS

International Search Report and Written Opinion for International Application No. PCT/US2009/036069, Search Completed Jun. 23, 2009, dated Jul. 7, 2009, 8 pgs.
(Continued)

*Primary Examiner* — Isaac T Tecklu
(74) *Attorney, Agent, or Firm* — KPPB LLP

(57) ABSTRACT

Systems and methods for providing an application marketplace configured to install applications outside of an application store provided by the entity providing the operating system of a computing device in accordance with embodiments of the invention are illustrated. In one embodiment, a system obtains device data from a computing device, wherein the device data identifies a computing device and includes metadata describes the characteristics of the computing device, generates application marketplace data based on the obtained device data, wherein the application marketplace data includes metadata describing at least one application installer, provides the application marketplace data to the computing device, obtains selected application data from the computing device, generates application installer data based on the device data and the selected application data by signing application data identified by the selected application data using OEM key data, and provides the application installer data to the computing device.

20 Claims, 18 Drawing Sheets

(51) Int. Cl.
  *G06Q 30/02* (2012.01)
  *H04W 4/00* (2018.01)
  *H04W 4/50* (2018.01)
  *H04W 4/60* (2018.01)

(52) U.S. Cl.
  CPC .......... *H04L 67/306* (2013.01); *H04W 4/001* (2013.01); *H04W 4/003* (2013.01); *H04W 4/50* (2018.02); *H04W 4/60* (2018.02)

(56) References Cited

U.S. PATENT DOCUMENTS

| | | | |
|---|---|---|---|
| 5,848,396 A | 12/1998 | Gerace | |
| 5,916,310 A | 6/1999 | Mccain | |
| 5,987,471 A | 11/1999 | Bodine et al. | |
| 6,018,343 A | 1/2000 | Wang et al. | |
| 6,023,698 A | 2/2000 | Lavey et al. | |
| 6,094,671 A | 7/2000 | Chase et al. | |
| 6,098,108 A | 8/2000 | Sridhar et al. | |
| 6,115,039 A | 9/2000 | Karren et al. | |
| 6,182,141 B1 | 1/2001 | Blum et al. | |
| 6,216,141 B1 | 4/2001 | Straub et al. | |
| 6,233,609 B1 | 5/2001 | Mittal | |
| 6,282,567 B1 | 8/2001 | Finch, II et al. | |
| 6,327,628 B1 | 12/2001 | Anuff et al. | |
| 6,363,409 B1 | 3/2002 | Hart et al. | |
| 6,456,307 B1 | 9/2002 | Bates et al. | |
| 6,697,838 B1 | 2/2004 | Jakobson | |
| 6,718,516 B1 | 4/2004 | Claussen et al. | |
| 6,810,410 B1 | 10/2004 | Durham | |
| 6,909,992 B2 | 6/2005 | Ashley | |
| 6,959,320 B2 | 10/2005 | Shah et al. | |
| 6,981,212 B1 | 12/2005 | Claussen | |
| 6,992,589 B2 | 1/2006 | Marsh | |
| 7,051,288 B2 | 5/2006 | Bennett et al. | |
| 7,207,000 B1 | 4/2007 | Shen et al. | |
| 7,272,786 B1 | 9/2007 | McCullough | |
| 7,401,325 B2 | 7/2008 | Backhouse et al. | |
| 7,614,018 B1 | 11/2009 | Ohazama et al. | |
| 7,636,683 B1 | 12/2009 | Mills et al. | |
| 7,681,134 B1 | 3/2010 | Grechishkin et al. | |
| 7,734,583 B2 | 6/2010 | Vitanov et al. | |
| 7,925,988 B2 | 4/2011 | Abernethy, Jr. et al. | |
| 7,950,026 B1 | 5/2011 | Urbach | |
| 7,996,785 B2 | 8/2011 | Neil | |
| 8,046,672 B2 | 10/2011 | Hegde et al. | |
| 8,176,321 B1 | 5/2012 | Perry et al. | |
| 8,181,254 B1 | 5/2012 | Kay et al. | |
| 8,209,598 B1 | 6/2012 | Pandey | |
| 8,260,845 B1 | 9/2012 | Colton et al. | |
| 8,296,643 B1 | 10/2012 | Vasilik | |
| 8,296,684 B2 | 10/2012 | Duarte et al. | |
| 8,335,817 B1 | 12/2012 | Dayan | |
| 8,346,222 B2 | 1/2013 | Zubas et al. | |
| 8,429,546 B2 | 4/2013 | Hilerio et al. | |
| 8,434,135 B2 | 4/2013 | Hilerio et al. | |
| 8,453,065 B2 | 5/2013 | Chaudhrl et al. | |
| 8,458,612 B2 | 6/2013 | Chatterjee et al. | |
| 8,555,155 B2 | 10/2013 | Harrison et al. | |
| 8,566,697 B2 | 10/2013 | Meredith et al. | |
| 8,613,070 B1 * | 12/2013 | Borzycki ............ | G06F 21/6218 726/8 |
| 8,634,821 B2 | 1/2014 | Raleigh | |
| 8,756,488 B2 | 6/2014 | Meredith et al. | |
| 8,775,275 B1 | 7/2014 | Pope | |
| 8,775,917 B2 | 7/2014 | Bourke et al. | |
| 8,775,925 B2 | 7/2014 | Bourke et al. | |
| 8,782,033 B2 | 7/2014 | Jiang et al. | |
| 8,788,955 B2 | 7/2014 | Quine | |
| 8,799,771 B2 | 8/2014 | Bourke et al. | |
| 8,806,333 B2 | 8/2014 | Bourke et al. | |
| 8,900,054 B2 | 12/2014 | Patel | |
| 8,954,989 B1 | 2/2015 | Paul et al. | |
| 9,021,469 B2 | 4/2015 | Posey et al. | |
| 9,069,735 B2 | 6/2015 | Bourke et al. | |
| 9,081,757 B2 | 7/2015 | Bourke et al. | |
| 9,083,566 B1 | 7/2015 | Pearson et al. | |
| 9,141,266 B2 | 9/2015 | McCormick et al. | |
| 9,235,803 B2 | 1/2016 | Claux et al. | |
| 9,268,466 B2 | 2/2016 | Momchilov et al. | |
| 9,547,725 B2 | 1/2017 | Chu et al. | |
| 9,628,574 B2 | 3/2017 | Bourke et al. | |
| 9,749,440 B2 | 8/2017 | Bourke | |
| 9,792,265 B2 | 10/2017 | Bourke et al. | |
| 2001/0047394 A1 | 11/2001 | Kloba et al. | |
| 2002/0109704 A1 | 8/2002 | Rajarajan et al. | |
| 2002/0129064 A1 | 9/2002 | Guthrie | |
| 2004/0019683 A1 | 1/2004 | Lee et al. | |
| 2004/0081310 A1 | 4/2004 | Lueckhoff | |
| 2004/0177327 A1 | 9/2004 | Kieffer | |
| 2004/0205531 A1 | 10/2004 | Innes | |
| 2004/0220926 A1 | 11/2004 | Lamkin et al. | |
| 2004/0221170 A1 | 11/2004 | Colvin et al. | |
| 2004/0268146 A1 | 12/2004 | Oberst et al. | |
| 2004/0268225 A1 | 12/2004 | Walsh et al. | |
| 2005/0005234 A1 | 1/2005 | Chen | |
| 2005/0021977 A1 | 1/2005 | Oberst et al. | |
| 2005/0027704 A1 | 2/2005 | Hammond et al. | |
| 2005/0097522 A1 | 5/2005 | Backhouse et al. | |
| 2005/0102374 A1 | 5/2005 | Moragne et al. | |
| 2005/0108678 A1 | 5/2005 | Goodwin et al. | |
| 2005/0210412 A1 | 9/2005 | Matthews | |
| 2005/0223086 A1 | 10/2005 | Raverdy et al. | |
| 2005/0273759 A1 | 12/2005 | Lucassen et al. | |
| 2006/0005187 A1 | 1/2006 | Neil | |
| 2006/0026438 A1 | 2/2006 | Stern | |
| 2006/0031785 A1 | 2/2006 | Raciborsk | |
| 2006/0059422 A1 | 3/2006 | Wu et al. | |
| 2006/0136964 A1 | 6/2006 | Diez et al. | |
| 2006/0161631 A1 | 7/2006 | Lira | |
| 2006/0224989 A1 | 10/2006 | Pettiross et al. | |
| 2006/0265280 A1 | 11/2006 | Nakada et al. | |
| 2007/0050777 A1 | 3/2007 | Hutchinson et al. | |
| 2007/0061700 A1 | 3/2007 | Kothari et al. | |
| 2007/0083356 A1 | 4/2007 | Brunet et al. | |
| 2007/0244919 A1 | 10/2007 | Wells et al. | |
| 2007/0245238 A1 | 10/2007 | Fugitt et al. | |
| 2007/0255576 A1 | 11/2007 | Patterson | |
| 2007/0255814 A1 | 11/2007 | Green et al. | |
| 2007/0277109 A1 | 11/2007 | Chen et al. | |
| 2007/0300068 A1 | 12/2007 | Rudelic | |
| 2008/0021696 A1 | 1/2008 | Bartelt et al. | |
| 2008/0040226 A1 | 2/2008 | Roker | |
| 2008/0082565 A1 | 4/2008 | Chang et al. | |
| 2008/0108333 A1 | 5/2008 | Jemison et al. | |
| 2008/0120129 A1 | 5/2008 | Seubert et al. | |
| 2008/0140529 A1 | 6/2008 | Agarwal et al. | |
| 2008/0154718 A1 | 6/2008 | Flake et al. | |
| 2008/0172487 A1 | 7/2008 | Brunet et al. | |
| 2008/0172736 A1 | 7/2008 | Barr et al. | |
| 2008/0208589 A1 | 8/2008 | Cross et al. | |
| 2008/0256636 A1 | 10/2008 | Gassoway | |
| 2009/0019371 A1 | 1/2009 | Audet | |
| 2009/0019436 A1 | 1/2009 | Hartz et al. | |
| 2009/0025063 A1 | 1/2009 | Thomas et al. | |
| 2009/0037452 A1 | 2/2009 | Baitalmal et al. | |
| 2009/0037492 A1 | 2/2009 | Baitalmal et al. | |
| 2009/0070228 A1 | 3/2009 | Ronen | |
| 2009/0077174 A1 | 3/2009 | Janssen et al. | |
| 2009/0125833 A1 | 5/2009 | Abernethy, Jr. et al. | |
| 2009/0132556 A1 | 5/2009 | Gupta et al. | |
| 2009/0171974 A1 | 7/2009 | Arthursson et al. | |
| 2009/0171993 A1 | 7/2009 | Arthursson | |
| 2009/0187928 A1 | 7/2009 | Mark | |
| 2009/0216775 A1 | 8/2009 | Ratliff et al. | |
| 2009/0217179 A1 | 8/2009 | Mons et al. | |
| 2009/0249188 A1 | 10/2009 | Dube et al. | |
| 2009/0249238 A1 | 10/2009 | Chudy et al. | |
| 2009/0271394 A1 | 10/2009 | Allen et al. | |
| 2009/0280907 A1 | 11/2009 | Larsen | |
| 2009/0282333 A1 | 11/2009 | Olsen et al. | |
| 2010/0017701 A1 | 1/2010 | Bargeron | |
| 2010/0023582 A1 | 1/2010 | Pedersen et al. | |
| 2010/0023855 A1 | 1/2010 | Hedbor et al. | |

(56) References Cited

U.S. PATENT DOCUMENTS

| | | |
|---|---|---|
| 2010/0023884 A1 | 1/2010 | Brichford et al. |
| 2010/0054128 A1 | 3/2010 | O'Hern |
| 2010/0057884 A1 | 3/2010 | Brownell et al. |
| 2010/0094878 A1 | 4/2010 | Soroca et al. |
| 2010/0114887 A1 | 5/2010 | Conway et al. |
| 2010/0146529 A1 | 6/2010 | Heath et al. |
| 2010/0205523 A1 | 8/2010 | Lehota et al. |
| 2010/0211906 A1 | 8/2010 | Kanai |
| 2010/0228594 A1 | 9/2010 | Chweh et al. |
| 2010/0233996 A1 | 9/2010 | Herz et al. |
| 2010/0306762 A1 | 12/2010 | Lindberg et al. |
| 2010/0318608 A1 | 12/2010 | Huang et al. |
| 2011/0016169 A1 | 1/2011 | Cahill et al. |
| 2011/0041003 A1 | 2/2011 | Pattar et al. |
| 2011/0055005 A1 | 3/2011 | Lang |
| 2011/0093900 A1 | 4/2011 | Patel et al. |
| 2011/0099558 A1 | 4/2011 | Patrick et al. |
| 2011/0099627 A1* | 4/2011 | Proudler ............... G06F 21/57 726/21 |
| 2011/0119571 A1 | 5/2011 | Decker et al. |
| 2011/0138295 A1 | 6/2011 | Momchilov et al. |
| 2011/0138314 A1 | 6/2011 | Mir et al. |
| 2011/0153806 A1 | 6/2011 | Bagasra |
| 2011/0173098 A1 | 7/2011 | Lee |
| 2011/0185354 A1 | 7/2011 | Tanner et al. |
| 2011/0209047 A1 | 8/2011 | Olsen et al. |
| 2011/0225178 A1 | 9/2011 | Ingrassia |
| 2011/0231280 A1* | 9/2011 | Farah ................. G06Q 10/10 705/26.8 |
| 2011/0238501 A1 | 9/2011 | Almeida |
| 2011/0282700 A1 | 11/2011 | Cockcroft |
| 2011/0289422 A1 | 11/2011 | Spivack et al. |
| 2011/0302510 A1 | 12/2011 | Harrison et al. |
| 2011/0302524 A1 | 12/2011 | Forstall |
| 2011/0307738 A1 | 12/2011 | Hilerio et al. |
| 2011/0307880 A1 | 12/2011 | Hilerio et al. |
| 2011/0307883 A1 | 12/2011 | Hilerio et al. |
| 2011/0307946 A1 | 12/2011 | Hilerio et al. |
| 2011/0314389 A1 | 12/2011 | Meredith et al. |
| 2012/0005346 A1 | 1/2012 | Burckart |
| 2012/0010995 A1 | 1/2012 | Skirpa et al. |
| 2012/0021774 A1 | 1/2012 | Mehta et al. |
| 2012/0030617 A1 | 2/2012 | Louch |
| 2012/0047442 A1 | 2/2012 | Nicolaou et al. |
| 2012/0054841 A1 | 3/2012 | Schultz et al. |
| 2012/0066583 A1 | 3/2012 | Priestley et al. |
| 2012/0066634 A1 | 3/2012 | Kim et al. |
| 2012/0079126 A1 | 3/2012 | Evans et al. |
| 2012/0084292 A1 | 4/2012 | Liang et al. |
| 2012/0084713 A1 | 4/2012 | Desai et al. |
| 2012/0096396 A1 | 4/2012 | Ording et al. |
| 2012/0131683 A1 | 5/2012 | Nassar et al. |
| 2012/0150963 A1 | 6/2012 | Horowitz et al. |
| 2012/0151368 A1 | 6/2012 | Tam |
| 2012/0166956 A1 | 6/2012 | Hilerio et al. |
| 2012/0166959 A1 | 6/2012 | Hilerio et al. |
| 2012/0173312 A1 | 7/2012 | Kern |
| 2012/0174075 A1 | 7/2012 | Carteri et al. |
| 2012/0179671 A1* | 7/2012 | Turner ............... G06F 17/30861 707/723 |
| 2012/0233243 A1 | 9/2012 | Ashkenazy et al. |
| 2012/0235912 A1 | 9/2012 | Laubach |
| 2012/0246291 A1 | 9/2012 | Wong et al. |
| 2012/0266186 A1 | 10/2012 | Parzygnat |
| 2012/0278127 A1 | 11/2012 | Kirakosyan et al. |
| 2012/0290919 A1 | 11/2012 | Melnyk et al. |
| 2012/0290950 A1 | 11/2012 | Rapaport et al. |
| 2012/0291022 A1 | 11/2012 | Mehta et al. |
| 2012/0296959 A1 | 11/2012 | Momchilov et al. |
| 2012/0297291 A1 | 11/2012 | Fainberg et al. |
| 2012/0297377 A1 | 11/2012 | Chen et al. |
| 2012/0303801 A1 | 11/2012 | Raschke et al. |
| 2012/0311419 A1 | 12/2012 | Kwak et al. |
| 2012/0323995 A1 | 12/2012 | Bourke et al. |
| 2012/0324338 A1 | 12/2012 | Meredith et al. |
| 2013/0024696 A1* | 1/2013 | Rudelic ............... H04L 9/0891 713/176 |
| 2013/0024763 A1 | 1/2013 | Nemati et al. |
| 2013/0024851 A1 | 1/2013 | Firman et al. |
| 2013/0073401 A1 | 3/2013 | Cook |
| 2013/0081081 A1 | 3/2013 | Wang |
| 2013/0111341 A1 | 5/2013 | Bier |
| 2013/0111559 A1 | 5/2013 | Lomille et al. |
| 2013/0124211 A1 | 5/2013 | McDonough |
| 2013/0124557 A1 | 5/2013 | Goode et al. |
| 2013/0139146 A1 | 5/2013 | Bickle et al. |
| 2013/0145348 A1 | 6/2013 | Agovic et al. |
| 2013/0160111 A1 | 6/2013 | Orr et al. |
| 2013/0173319 A1 | 7/2013 | Thomas et al. |
| 2013/0191242 A1* | 7/2013 | Daniel ............... G06Q 30/0631 705/26.7 |
| 2013/0191445 A1 | 7/2013 | Gayman et al. |
| 2013/0197972 A1 | 8/2013 | Taguchi et al. |
| 2013/0204975 A1 | 8/2013 | Keith, Jr. |
| 2013/0227646 A1* | 8/2013 | Haggerty ........... H04L 63/0853 726/3 |
| 2013/0238999 A1 | 9/2013 | Helms et al. |
| 2013/0246906 A1 | 9/2013 | Haman |
| 2013/0247030 A1 | 9/2013 | Kay et al. |
| 2013/0262168 A1 | 10/2013 | Makanawala et al. |
| 2013/0268837 A1 | 10/2013 | Braithwaite |
| 2013/0282798 A1 | 10/2013 | McCarthy et al. |
| 2013/0290879 A1 | 10/2013 | Greisson |
| 2013/0304581 A1 | 11/2013 | Soroca et al. |
| 2013/0304608 A1 | 11/2013 | Mehta et al. |
| 2014/0019958 A1* | 1/2014 | Sherman ................. G06F 8/61 717/178 |
| 2014/0053107 A1 | 2/2014 | Patel |
| 2014/0068419 A1 | 3/2014 | Bourke et al. |
| 2014/0068420 A1 | 3/2014 | Bourke et al. |
| 2014/0068421 A1 | 3/2014 | Bourke et al. |
| 2014/0095886 A1* | 4/2014 | Futral ............... G06F 21/572 713/187 |
| 2014/0114901 A1* | 4/2014 | Pradhan ............. G06Q 30/0631 706/50 |
| 2014/0172915 A1 | 6/2014 | Herbach et al. |
| 2014/0189546 A1 | 7/2014 | Hilerio et al. |
| 2014/0229520 A1 | 8/2014 | Scott et al. |
| 2014/0236756 A1 | 8/2014 | Bourke et al. |
| 2014/0250105 A1* | 9/2014 | Shankar ........... G06F 17/30867 707/722 |
| 2014/0258845 A1 | 9/2014 | Machado et al. |
| 2014/0297516 A1 | 10/2014 | Brown et al. |
| 2014/0325344 A1 | 10/2014 | Bourke et al. |
| 2014/0358657 A1 | 12/2014 | Smullen et al. |
| 2014/0365602 A1* | 12/2014 | Hillary ................. H04W 4/001 709/217 |
| 2014/0365962 A1* | 12/2014 | Lee ..................... G06F 9/542 715/810 |
| 2015/0020126 A1 | 1/2015 | Kegel et al. |
| 2015/0051972 A1 | 2/2015 | Chweh et al. |
| 2015/0106801 A1* | 4/2015 | Agrawal ................. G06F 8/60 717/177 |
| 2015/0163549 A1* | 6/2015 | Suh ................... H04N 21/4753 725/30 |
| 2015/0172374 A1* | 6/2015 | Chaudhry ........... H04L 67/1095 709/217 |
| 2015/0186999 A1* | 7/2015 | Wei ..................... G06Q 40/04 705/2 |
| 2015/0188980 A1 | 7/2015 | Bourke |
| 2015/0331685 A1 | 11/2015 | Bourke et al. |
| 2015/0332287 A1 | 11/2015 | Arroyo et al. |
| 2016/0110066 A1 | 4/2016 | McCormick et al. |
| 2017/0310784 A1 | 10/2017 | Bourke |

FOREIGN PATENT DOCUMENTS

| | | |
|---|---|---|
| JP | 2004185083 A | 7/2004 |
| WO | 9952056 A1 | 10/1999 |
| WO | 2006120280 A1 | 11/2006 |
| WO | 2011160139 A1 | 12/2011 |
| WO | 2012154501 A2 | 11/2012 |
| WO | 2012177664 A1 | 12/2012 |

(56) References Cited

FOREIGN PATENT DOCUMENTS

| WO | 2013074713 A1 | 5/2013 |
| WO | 2014025544 A1 | 2/2014 |
| WO | 2014035580 A2 | 3/2014 |
| WO | 2014130875 A1 | 8/2014 |
| WO | 2015103233 A1 | 7/2015 |

OTHER PUBLICATIONS

International Search Report and Written Opinion for International Application No. PCT/US2012/065136, Search Completed Jan. 29, 2013, dated Feb. 8, 2013, 8 pgs.
International Search Report and Written Opinion for International Application No. PCT/US2013/052562, Search Completed Jan. 30, 2014, dated Feb. 7, 2014, 5 pgs.
International Search Report and Written Opinion for International Application No. PCT/US2013/052861, Search Completed Jan. 29, 2014, dated Feb. 21, 2014, 8 pgs.
International Search Report and Written Opinion for International Application No. PCT/US2013/057087, Search Completed Feb. 27, 2014, dated Mar. 19, 2014, 11 pgs.
International Search Report and Written Opinion for International Application PCT/US2011/041129, Search Completed Sep. 22, 2011, dated Mar. 9, 2011, 15 pgs.
International Search Report and Written Opinion for International Application PCT/US2014/072707, Search Completed Apr. 9, 2015, dated Apr. 24, 2015, 5 pgs.
Extended European Search Report for European Application EP09718357.8, report completed Oct. 2, 2014, dated Oct. 10, 2014, 5 Pgs.
"How to Use the Remote Shutdown Tool to Shut Down and Restart a computer in Windows 2000", Retrieved from http://support.microsoft.com/kb/317371, Jul. 5, 2006, 2 pages.
Heino et al., "Developing Semantic Web Applications with the OntoWiki Framework", Springer, 2009, pp. 61-77.
Laufer, "A Hike through Post-EJB J2EE Web Application Architecture", IEEE, Computing in Science & Engineering, 2005, pp. 80-88.
Lee et al., "Integrating Service Composition Flow with User Interactions", 2008 IEEE International Symposium on Service-Oriented System Engineering, 2008, pp. 103-108.
Mikkonen et al., "Towards a Uniform Web Application Platform for Desktop Computers and Mobile Devices", Sun Microsystems, Inc., Oct. 2008, pp. 1-29.
OREN, "SemperWiki: A Semantic Personal Wiki", Proceedings of the 2005 International Conference on Semantic Desktop Workshop: Next Generation Information Management D Collaboration Infrastructure, vol. 175, Nov. 6, 2005, pp. 107-122.
STEARN, "XULRunner: A New Approach for Developing Rich Internet Applications", IEEE Computer Society, May/Jun. 2007, pp. 67-73.
Sugawara et al., "A Novel Intuitive GUI Method for User-friendly Operation", Knowledge-Based Systems, vol. 22, 2009, pp. 235-246.
Extended European Search Report for European Application No. 13847844.1, Search completed Nov. 15, 2016, dated Nov. 24, 2016, 8 pgs.
Extended European Search Report for European Application No. 14754141.1, Search completed Aug. 9, 2016, dated Aug. 18, 2016, 8 Pgs.
Extended European Search Report for European Application No. 14876001.0, Search completed Apr. 21, 201, dated May 5, 2017, 11 Pgs.
International Preliminary Report on Patentability for International Application PCT/US14/17806, Report Issued Aug. 25, 2015, dated Sep. 3, 2015, 4 Pgs.
International Preliminary Report on Patentability for International Application PCT/US2013/052042, Report Issued Feb. 10, 2015, dated Feb. 19, 2015, 10 Pgs.
International Preliminary Report on Patentability for International Application PCT/US2013/052562, Report Issued Mar. 3, 2015, dated Mar. 12, 2015, 4 Pgs.
International Preliminary Report on Patentability for International Application PCT/US2013/052861, Report Issued Apr. 21, 2015, dated Apr. 30, 2015, 7 Pgs.
International Preliminary Report on Patentability for International Application PCT/US2013/057087, Report Issued Mar. 3, 2015, dated Mar. 12, 2015, 10 Pages.
International Preliminary Report on Patentability for International Application PCT/US2014/072707, Report issued Jul. 5, 2016, dated Jul. 14, 2016, 4 Pgs.
International Search Report and Written Opinion for International Application No. PCT/US13/52042, International Filing Date Jul. 25, 2013, Search Completed Dec. 13, 2013, dated Dec. 23, 2013, 12 pgs.
International Search Report and Written Opinion for International Application PCT/US2012/43189, International Filing Date Jun. 19, 2012, Report Completed Aug. 12, 2012, dated Sep. 4, 2012, 6 pgs.
International Search Report and Written Opinion for International Application PCT/US2014/072707, Report Completed Apr. 9, 2015, dated Apr. 24, 2015, 5 pgs.
Written Opinion of the International Searching Authority for International Application No. PCT/US2009/36069, date completed Jun. 27, 2009, dated Jul. 7, 2009, 5 pgs.
Written Opinion Report for International Application PCT/US2011/041129, Report completed Sep. 22, 2011; 12 pgs.
International Search Report and Written Opinion for International Application PCT/US14/17806, report completed May 28, 2014, dated Jun. 17, 2014, 5 Pgs., dated Jun. 17, 2014.
Davidyuk et al., "Context-Aware Middleware for Mobile Multimedia Applications", ACM, Jan. 1, 2004, pp. 213-220.
DLNA, "Overview and Vision White Paper", Jun. 1, 2004, 16 pgs.
POKKI, Download Free Desktop Apps and games. available at http://web.archive.org/web/20150105201753/https://www.pokki.com/, 3 pgs., Jan. 15, 2013.
Sen et al., "Feed Me: A Collaboration Alert Filtering System", ACM 2006, Nov. 8, 2006, 11 pgs.

* cited by examiner

SYSTEMS AND METHODS FOR APPLICATION INSTALLATION PLATFORMS

CROSS-REFERENCE TO RELATED APPLICATIONS

The instant application is a continuation in part of U.S. patent application Ser. No. 14/714,095, filed May 15, 2015, which application claims priority to U.S. Provisional Patent Application No. 61/994,033, filed May 15, 2014, the disclosures of which are hereby incorporated by reference in their entirety.

FIELD OF THE INVENTION

The present invention is generally related to applications and more specifically to applications that manage and install application on a computing device.

BACKGROUND

An application store is a type of digital distribution platform for software, often provided as a component of an operating system on a personal computer or mobile device. Application stores typically take the form of an online store, where users can browse through different categories and genres of applications and automatically download and install the application on their device. Some application stores may also include a system to automatically remove an installed program from devices under certain conditions, such as to protect the user against a malicious program. A variety of application stores exist, such as the Google Play service provided by Google, Inc. of Mountain View, Calif. and the App Store provided by Apple, Inc. of Cupertino, Calif.

SUMMARY OF THE INVENTION

Systems and methods for providing an application marketplace configured to install applications outside of an application store provided by the entity providing the operating system of a computing device in accordance with embodiments of the invention are illustrated. In one embodiment, a system includes a processor and a memory readable by the processor and storing instructions, wherein the instructions, when read by the processor, direct the processor to obtain device data from a computing device, wherein the device data identifies a computing device and includes metadata describes the characteristics of the computing device, generate application marketplace data based on the obtained device data, wherein the application marketplace data includes metadata describing at least one application installer, provide the application marketplace data to the computing device, obtain selected application data from the computing device, generate application installer data based on the device data and the selected application data by signing application data identified by the selected application data using OEM key data, and provide the application installer data to the computing device.

In another embodiment of the invention, the metadata describing the characteristics of the computing device describes characteristics selected from the group consisting of demographic information related to the user of the computing device, the hardware capabilities of the computing device, operating system software installed on the computing device, and applications installed on the computing device.

In an additional embodiment of the invention, the application marketplace data is utilized by the computing device to generate at least one touchpoint for browsing the application marketplace data.

In yet another additional embodiment of the invention, at least one of the at least one generated touchpoints includes advertising data.

In still another additional embodiment of the invention, the advertising data is provided by a third-party advertising server system.

In yet still another additional embodiment of the invention, the device data further includes a timestamp identifying when the device data was provided and the instructions further direct the processor to optimize the application marketplace data based on the timestamp.

In yet another embodiment of the invention, the instructions further direct the processor to generate analytics data based on the obtained device data, the application marketplace data, the selected application data, and the generated application installer data.

In still another embodiment of the invention, the instructions further direct the processor to provide an interface for displaying the generated analytics data.

In yet still another embodiment of the invention, an application platform application are installed on the computing device prior to a first boot of the system and the application platform application directs the application install platform to install application data using application install data during the first boot of the system.

In yet another additional embodiment of the invention, the application platform application directs the computing device to display the application marketplace data during the first boot of the computing device.

Yet another embodiment of the invention includes a method for installing applications including obtaining device data from a computing device using a system, wherein the device data identifies a computing device and includes metadata describes the characteristics of the computing device and the system includes a processor and a memory connected to the processor, generating application marketplace data based on the obtained device data using the system, wherein the application marketplace data includes metadata describing at least one application installer, providing the application marketplace data to the computing device using the system, obtaining selected application data from the computing device using the system, generating application installer data based on the device data and the selected application data by signing application data identified by the selected application data using OEM key data using the system, and providing the application installer data to the computing device using the system.

In yet another additional embodiment of the invention, the metadata describing the characteristics of the computing device describes characteristics selected from the group consisting of demographic information related to the user of the computing device, the hardware capabilities of the computing device, operating system software installed on the computing device, and applications installed on the computing device.

In still another additional embodiment of the invention, the application marketplace data is utilized by the computing device to generate at least one touchpoint for browsing the application marketplace data.

In yet still another additional embodiment of the invention, at least one of the at least one generated touchpoints includes advertising data.

In yet another embodiment of the invention, the advertising data is provided by a third-party advertising server system.

In still another embodiment of the invention, the device data further includes a timestamp identifying when the device data was provided and the instructions further direct the processor to optimize the application marketplace data based on the timestamp.

In yet still another embodiment of the invention, the instructions further direct the processor to generate analytics data based on the obtained device data, the application marketplace data, the selected application data, and the generated application installer data.

In yet another additional embodiment of the invention, the instructions further direct the processor to provide an interface for displaying the generated analytics data.

In still another additional embodiment of the invention, an application platform application are installed on the computing device prior to a first boot of the system and the application platform application directs the application install platform to install application data using the application install data during the first boot of the system.

In yet still another additional embodiment of the invention, the application platform application directs the computing device to display the application marketplace data during the first boot of the computing device.

DETAILED DESCRIPTION

Figure 1A:
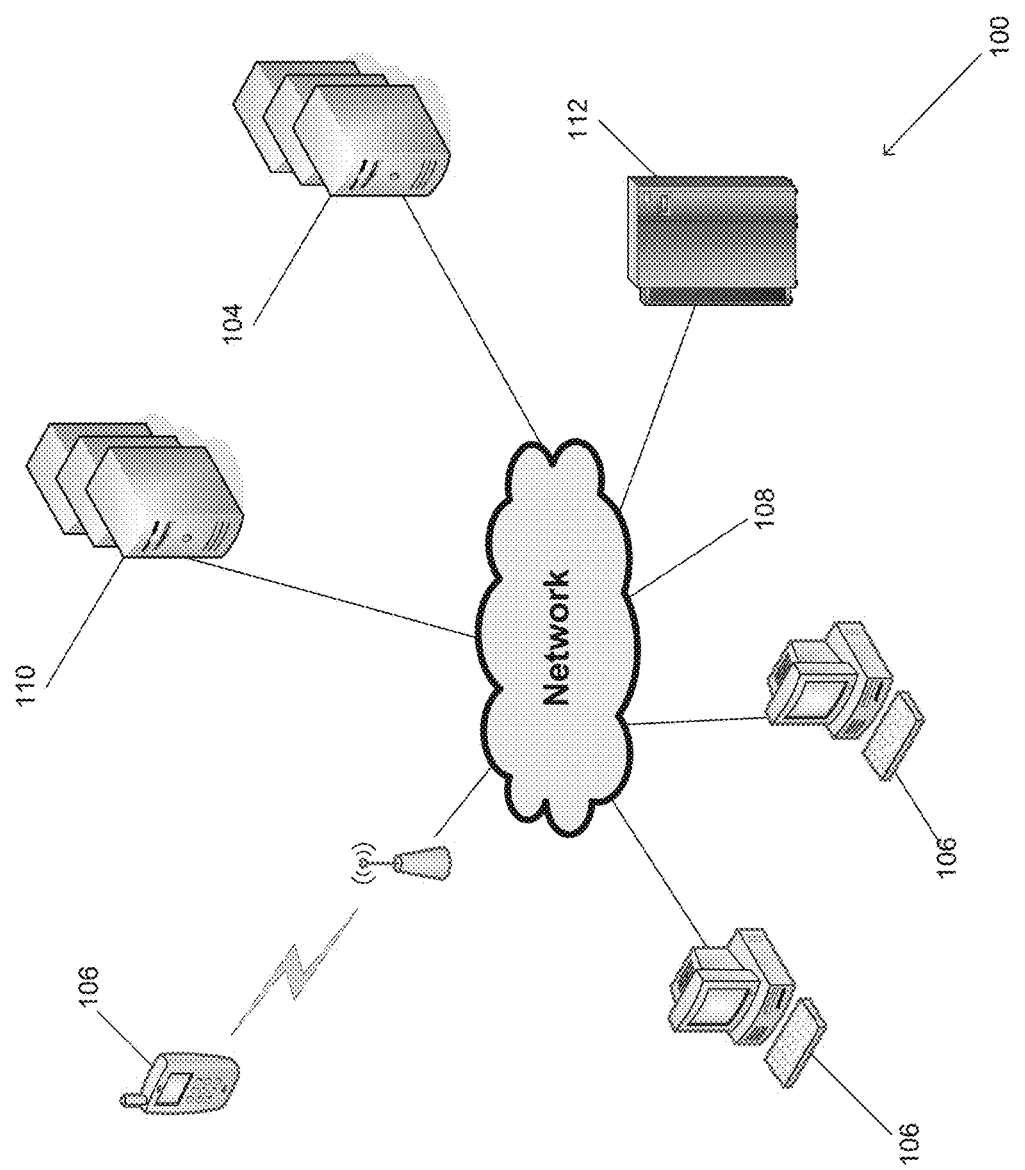
FIG. 1A is a network diagram illustrating an application installation platform in accordance with an embodiment of the invention.

Turning now to the drawings, systems and methods for application installation platforms in accordance with embodiments of the invention are illustrated. A major problem facing OEM computing device providers is that the OEM's struggle to monetize and differentiate devices through applications provided on the computing devices. The OEMs do not have access to the same class of solutions that developers do—for example, there are no advertising platforms to help OEMs monetize applications or performance metric measuring platforms to provide OEMs analytics of the applications. Therefore, OEMs are forced to hard bundle applications on devices in order to make up for low margins and stand out in a crowded space. For example, OEMs preload many (up to 40 or more) applications on their computing devices. They do so to differentiate their products and of course, to boost margins, as application developers pay to be preloaded. However, the current method of manually bundling applications is completely broken. It is not ideal for OEMs, it does not work for the application developers, and users hate it. In fact, a recent study of users showed that they completely ignore the company's pre-bundled software offerings, which means it is not working for any of the stakeholders. The preloading application model is broken for several reasons, including an inability to segment different applications for different SKUs in different geographies, languages, and channels. In other words, no ability to try to deliver the right applications by device type, device mode (tablet or PC mode), customer segment (SMB vs. gamer), timing (tax application during tax season), etc. . . . Instead, it is a spray-and-pray approach. Today, OEMs manually manage and deploy a master software image onto all their devices during the manufacturing process, which is why they have to stuff so many applications onto each image. Additionally, there is no way to recommend applications on an ongoing basis. Today, they have one shot to get you to use one of the generic applications they preloaded 6 months ago based on a limited number of application partnerships the OEMs have entered into with application providers. Today, OEMs have a handful of big global application deals with the top 0.1% of application providers because of their inability to segment, as well as the inability to recommend applications over the lifetime of the device. The OEMs cannot work with the 99.9% of developers who would kill to be promoted on new devices to the right users. They cannot promote a hot game the day it comes out or a tax application during tax season. Moreover, OEMs lack analytics tools to know what users like and what they do not. Today, OEMs know when their devices leave the factory and get some reports back from the retail distribution chain but do not have insights into their devices, the applications on their devices, and the customers of their devices to help them make better decisions.

Application install platforms provide an environment for application developers and original equipment manufacturers (OEMs) to differentiate and monetize any computing device by combining several distribution capabilities along with analytics, advertising networks, and device controls. Applications and/or application installers can be provided to computing devices in a variety of manners, including dynamically preloading applications, making smart application recommendations tailored to particular computing devices, and/or providing third party touchpoints within the computing environment provided on a computing device. In many embodiments, application platform applications can be automatically generated for specific computing devices. As described in more detail below, application platform applications can execute within the computing environment created by the operating system of the computing device and/or create the computing environment itself. The application platform applications can be utilized to install a variety of applications; these applications can be tailored by the OEMs to dynamically pre-load the latest applications on a computing device, thereby eliminating the need to have a specific device image for a computing device that is commonly out-of-date by the time a computing device is activated. In addition to providing applications and application installers, application installation platforms can track and analyze a variety of computing devices and provide advertising and recommendations tailored to specific computing devices.

Application Installation Platforms

Application installation platforms in accordance with embodiments of the invention are designed to combat and solve the problems associated with preloading applications on computing devices. The application installation platform provides OEMs a way to improve the user satisfaction as well as the differentiation and monetization of their devices. In a variety of embodiments, application installation platforms include an platform management server system that gives OEMs ability to control, track and manage applications delivered to computing devices in real-time, an ad network system that powers contextually relevant application install recommendations, an analytics console that offers performance metrics and insight into applications and their devices, and white-label touchpoints installed on computing devices to plug application install ads and present those advertisements to users. In a variety of embodiments, a platform management server system can generate application data and/or metadata associated with the application data that can be utilized to customize the display and installation of applications to a specific (class of) computing devices as described in more detail below.

Turning now to FIG. 1A, an application install platform in accordance with an embodiment of the invention is conceptually illustrated. The application installation platform 100 includes computing devices 106, an advertising server 110, a platform management server system 104, and an officially sanctioned marketplace 112. Computing devices 106 include, but are not limited to, personal computers, tablets, mobile phones, and any other computing device capable of installing and executing software applications. Mobile phones include, but are not limited to, devices running iOS provided by Apple, Inc., Android provided by Google, Inc., and Windows Phone OS provided by Microsoft, Inc. of Redmond, Wash. The network 108 is any of a variety of networks that provide connectivity between the different systems within the application installation platform 100, including but not limited to the Internet. In this way, the application installation platform provides cloud-based services that provide OEMs application install capabilities they have never had before in their manually bundled images.

The advertising server 110 can configure, control, and optimize the applications that are promoted in any customer-facing touchpoint in real-time managed through a secure, web-based console. This reduces the costs, complexities, and inefficiencies behind the old preload model. Additionally, applications can be targeted to particular segments and distribution on SKUs by variables such as geography, language, device type, device mode, customer segment, and timing. Advertising server 110 deploys applications from a dynamic cloud-based solution rather than manually bundling applications during manufacturing and promotes applications through engaging white-label interfaces not only at first boot, but also throughout the lifetime of the device. Additionally, the advertising server 110 provides a marketplace of applications from application developers vying to be promoted on a variety of computing devices.

The platform management server system 104 and/or the advertising server system 110 can also generate application platform applications for a variety of computing devices. As described in more detail below, an application platform application can be created based on the capabilities of a particular computing device or class of computing device. In this way, the application platform application can be tailored to the specific hardware and/or software available on the computing device. In many embodiments, the platform management server system and/or advertising server system obtains metadata describing a computing device and generates fingerprint data describing the capabilities of the computing device. In a number of embodiments, the fingerprint data is utilized in the creation of the application platform application.

In a variety of embodiments, the computing devices 106, advertising server 110, platform management server system 104, and/or officially sanctioned marketplace 112 provides a user interface allowing for visualizing and interacting with the data. In several embodiments, the computing devices 106, advertising server 110, OEM application provider 104, and/or officially sanctioned marketplace 112 provides an interface, such as an application programming interface (API) or web service that provides some or all of the data to third-party systems for further processing. Access to the interface can be open and/or secured using any of a variety of techniques, such as by using client authorization keys, as appropriate to the requirements of specific applications of the invention.

Although a specific architecture for an application installation platform 100 in accordance with an embodiment of the invention is conceptually illustrated in FIG. 1A, any of a variety of architectures, including those that store data or applications on disk or some other form of storage and are loaded into memory at runtime, can also be utilized. It should be appreciated that any of the systems described above can be combined and/or divided to perform the described functionality. Additionally, any of the data utilized within the system can be cached and transmitted once a network connection (such as a wireless network connection via a communications interface) becomes available.

Figure 1B:
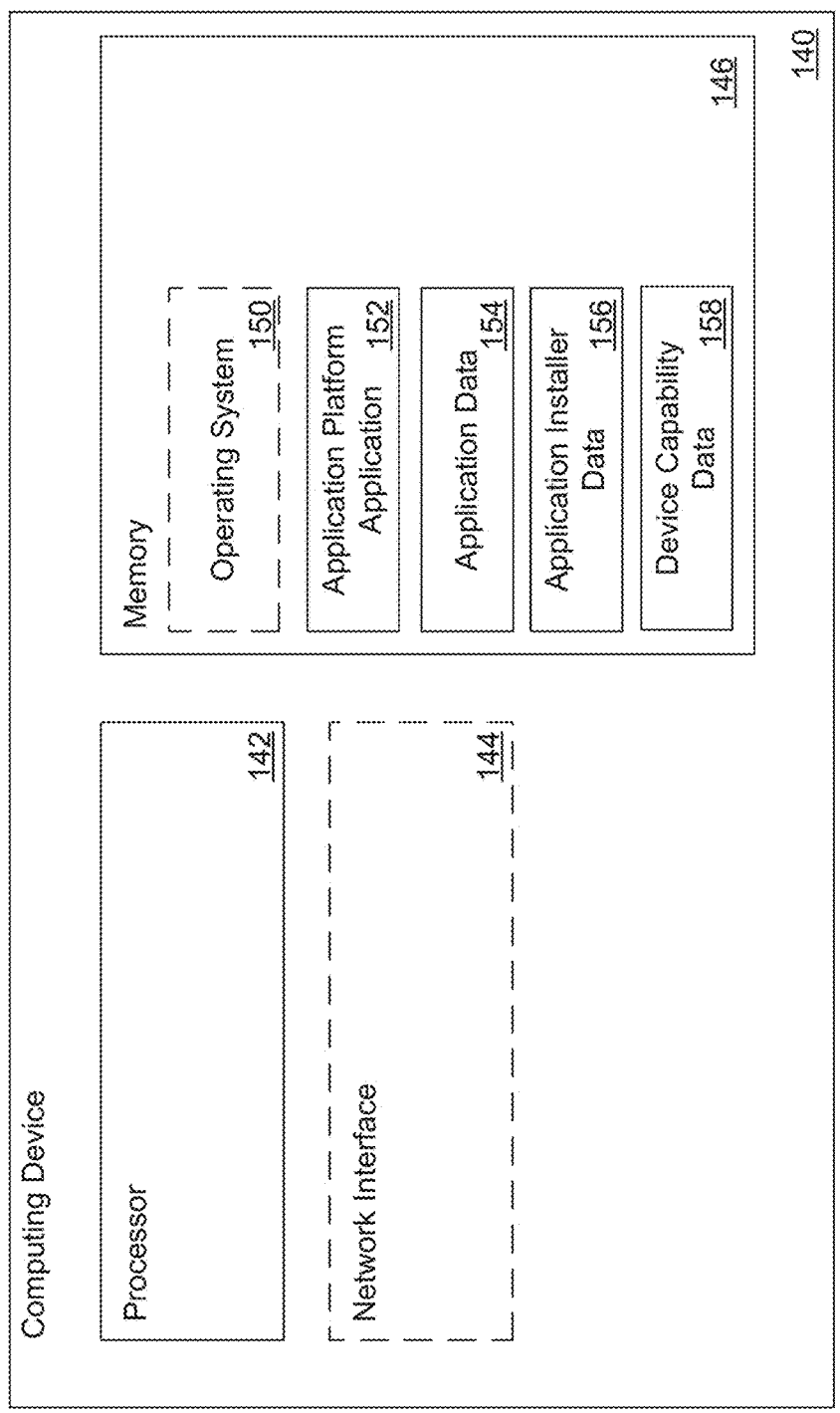
FIG. 1B is a conceptual illustration of a computing device in accordance with an embodiment of the invention.

A conceptual illustration of a computing device in accordance with an embodiment of the invention is shown in FIG. 1B. The computing device 140 includes a processor 142 in communication with memory 146. The computing device 140 can also include a network interface 144 sends and receives data over a network connection. In a number of embodiments, the network interface 144 is in communication with the processor 142 and/or the memory 146. In several embodiments, the memory 146 is any form of storage capable of storing a variety of data, including, but not limited to, an operating system 150, application platform application 152, application data 154, application installer data 156, and device capability data 158. In many embodiments, operating system 150, application platform application 152, application data 154, application installer data 156, and/or device capability data 158 are stored using an external server system and received by the computing device 140 using the network interface 144. The processor 142 can be directed by the application platform application 152 to perform a variety of processes as described in more detail below. In embodiments where the application platform applications executes within the computing environment created by an operating system installed on the computing device 140, the application platform application 152 can execute as a system level application, a user level application, a system-signed application, or as any other run level as appropriate to the requirements of specific applications of embodiments of the invention. In a number of embodiments, the run level at which the application platform application 152 executes provides a higher level of access to operating system resources than applications installed on the computing device using the application platform application 152.

Figure 1C:
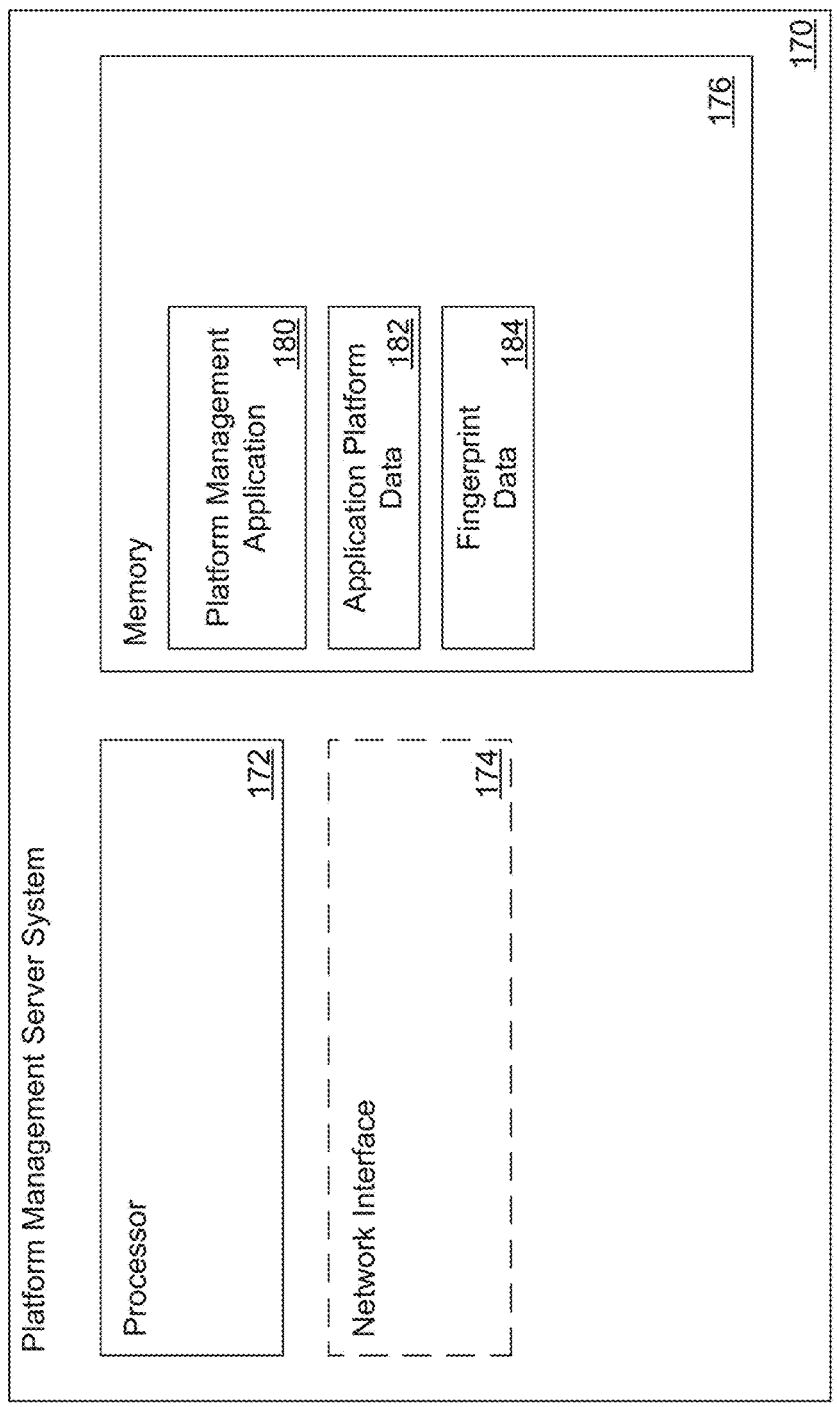
FIG. 1C is a conceptual illustration of a platform management server system in accordance with an embodiment of the invention.

A conceptual illustration of a platform management server system in accordance with an embodiment of the invention is shown in FIG. 1C. The platform management server system 170 includes a processor 172 in communication with memory 176. The platform management server system 170 can also include a network interface 174 sends and receives data over a network connection. In a number of embodiments, the network interface 174 is in communication with the processor 172 and/or the memory 176. In several embodiments, the memory 176 is any form of storage capable of storing a variety of data, including, but not limited to, a platform management application 180, application platform data 182, and fingerprint data 184. In many embodiments, platform management application 180, application platform data 182, and/or fingerprint data 184 are stored using an external server system and received by the platform management server system 170 using the network interface 174. The processor 172 can be directed by the platform management application 180 to perform a variety of processes as described in more detail below.

Although specific architectures for computing devices and platform management server systems in accordance with embodiments of the invention are conceptually illustrated in FIGS. 1B and 1C, any of a variety of architectures, including those which store data or applications on disk or some other form of storage and are loaded into memory at runtime and systems that are distributed across multiple physical servers, can also be utilized in accordance with embodiments of the invention. In a variety of embodiments, memory includes circuitry such as, but not limited to, memory cells constructed using transistors, that store instructions. Similarly, a processor can include logic gates formed from transistors (or any other device) that dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices.

Generating Application Install Platform Applications

A variety of applications and/or advertisements can be provided to computing devices by an application platform application. The application platform application can execute within the computing environment created by an operating system installed on the computing device and/or provide the computing environment of the computing device as appropriate to the requirements of specific applications of embodiments of the invention. In several embodiments, the application platform application is automatically generated for a computing device (and/or a class of computing devices) based on the hardware and/or software present in the computing device. In a variety of embodiments, the generation of the application platform application is further based on the manufacturer, such as the OEM, providing the computing device.

Each computing device and/or class of computing device can be identified using fingerprint data describing the (class of) computing device. In many embodiments, device capability data can be obtained that describes the hardware and/or software capabilities of a (class of) computing devices. Hardware and software that can be described in the device capability data and/or fingerprint data can include, but is not limited to, the processor, memory, network interface, modem, firmware version, operating system version, amount of random access memory (RAM), amount of storage space, camera manufacturer, camera resolution, camera zoom capability, presence of camera flash, screen size, screen resolution, screen orientation, presence of hardware alert indicators (such as a single-color LED or a multi-color LED), and any other hardware and/or software as appropriate to the requirements of specific applications of embodiments of the invention. The fingerprint data can be utilized to identify the appropriate drivers for the specific (class of) computing device for inclusion in the application platform application along with tailoring the application platform application for the specific capabilities of the computing device. Additionally, the fingerprinting data can be utilized to ensure compatibility in the applications and/or advertisements provided to a particular (class of) computing devices. By automatically generating an application platform application for each (class of) computing device, the application platform application itself can be utilized to track the computing devices. In a variety of embodiments, a new computing device can be compared it to prior fingerprinted devices to see whether a device is the same as prior devices that have included the application install platform application.

Figure 2A:
FIG. 2A is a conceptual rendering of an application installation platform executing on a variety of computing devices in accordance with an embodiment of the invention.

Turning now to FIG. 2A, an application platform application executing on a plurality of computing devices 200 in accordance with an embodiment of the invention is conceptually illustrated. The application platform application can includes an online console that allows OEMs to, asynchronously and/or in real-time, customize, optimize, and track the applications that are delivered and installed on any specific computing device, both at the out-of-box experience and then throughout the lifetime of the device as described in more detail below. In many embodiments, the display of the various applications that can be installed within the application platform application is rendered based on metadata associated with the applications that customizes the appearance of the displayed applications based on the characteristics of the computing device. In a variety of embodiments, the metadata also includes tracking data identifying on which computing devices the application is advertised and/or installed.

Figure 2B:
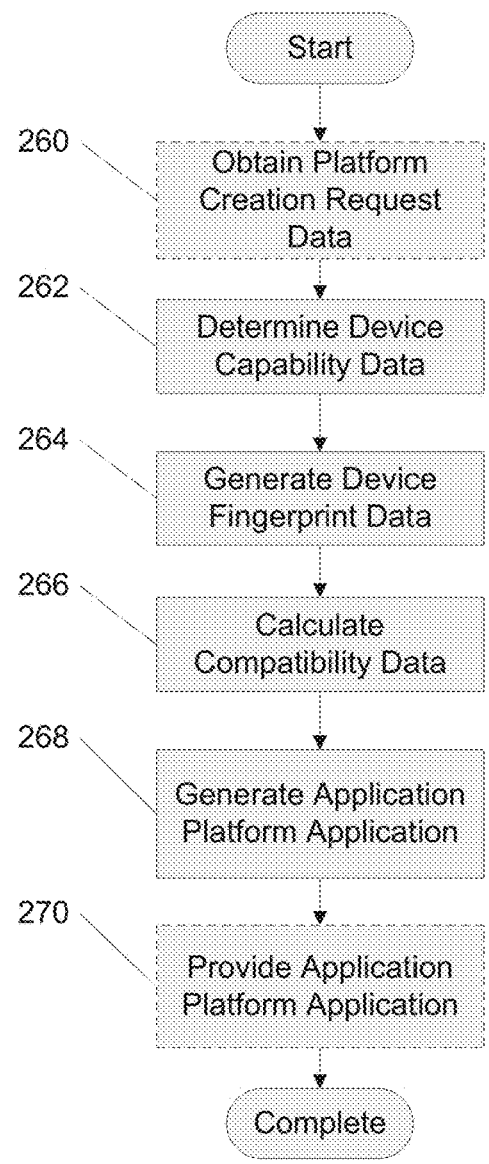
FIG. 2B is a flowchart illustrating a process for generating application platform applications in accordance with an embodiment of the invention.

Turning now to FIG. 2B, a process for generating application platform applications in accordance with an embodiment of the invention is shown. The process 250 can include obtaining (260) platform creation request data. Device capability data is determined (262), device fingerprint data is generated (264), compatibility data is calculated (266), and an application platform application is generated (268). In several embodiments, the application platform application is provided (270). Although specific processes for generating application platform applications in accordance with embodiments of the invention are described above with respect to FIG. 2B, any number of processes can be utilized as appropriate to the requirements of a specific application in accordance with embodiments of the invention.

Pre-Loading Application Data

Application platform applications allow a variety of application data and/or application installer data to be dynamically preloaded onto a computing device. As described in more detail below, the application data and/or application installer data can be optimized for a specific computing device based on the capabilities of the computing device, the location of the device, the language of the device, advertising channel, and any of a variety of other data as appropriate to the requirements of specific applications of embodiments of the invention. By customizing application data and/or application installer data for specific (classes of) computing devices, the amount of testing necessary to verify the compatibility of a particular application can be reduced. In a variety of embodiments, the application data and/or application installer data can be further customized to include specific advertisement data and/or be modified to receive advertisement data from particular advertisement systems. The application data and/or application installer data can be pre-loaded onto a computing device and/or be dynamically transmitted to a computing device. The dynamic transmission of the application data and/or application installer data can be on first boot of the computing device, on initial setup of the computing device, or any other time as appropriate to the requirements of specific applications of embodiments of the invention. Application data includes the specific executable data and other resources necessary to execute an application within the computing environment created by the operating system of the computing device. Application installer data can include the application data along with a variety of other metadata utilized to install the application data on the computing device. The application installer data, when executed by an application installer application, can cause some or all of the associated application data be obtained from a remote server system. In many embodiments, the applications available to a specific computing device (or class of computing device) can be determined by specification data provided by an OEM, user preference data obtained from a specific computing device, capability data and/or fingerprint data describing the hardware and/or software installed on the computing device, or any combination thereof.

Figure 3A:
FIG. 3A is a conceptual rendering of a computing device having pre-installed applications in an application platform installer in accordance with an embodiment of the invention.

Turning now to FIG. 3A, a conceptual illustration of a computing device executing an application platform application and having a variety of pre-loaded application data in accordance with an embodiment of the invention is shown. The computing device 300 includes advertising supported applications 310, free applications 312, applications with built-in microtransactions 314, and built-in applications 316. Free applications include those applications that are not modified when provided via or installed by an application platform application. Built-in applications 316 include those applications that are included with the operating system of the computing device and are not managed using an application platform application. Applications with advertising support 310 and/or microtransactions 314 (or both) can present advertising and/or process transactions utilizing a variety of techniques described in more detail below. In several embodiments, metadata associated with the displayed applications is utilized in the rendering of the display of the applications on the computing device 300 and/or tracking the display and installation of the applications on the computing device.

Figure 3B:
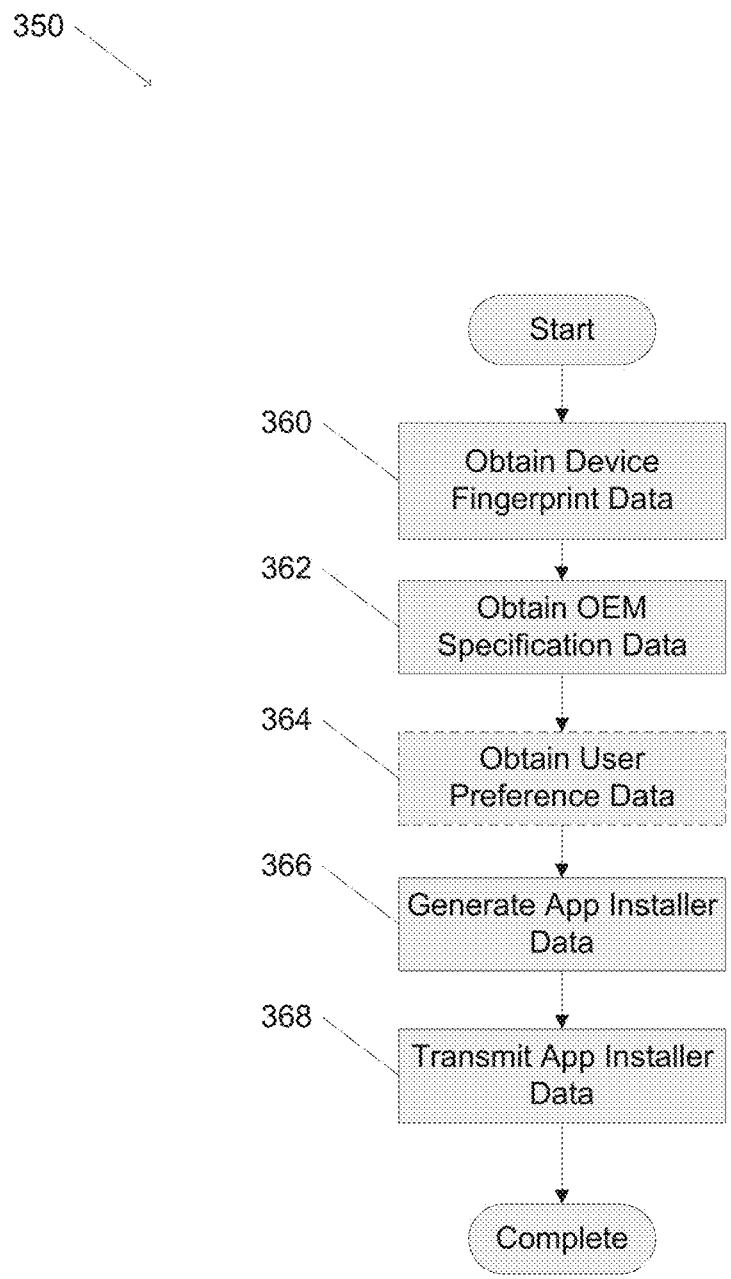
FIG. 3B is a flowchart illustrating a process for preloading applications on a device using an application install platform in accordance with an embodiment of the invention.

Turning now to FIG. 3B, a process for pre-loading application data in accordance with an embodiment of the invention is shown. The process 350 includes obtaining (360) device fingerprint data, OEM specification data (362), and, in a number of embodiments, user preference data (364). Application installer data can be generated (366) and transmitted (368). Although specific processes for pre-loading application data in accordance with embodiments of the invention are described above with respect to FIG. 3B, any number of processes, including those that provide application data directly without an installer, can be utilized as appropriate to the requirements of a specific application in accordance with embodiments of the invention.

Managing Installed Application Data

Figure 4A:
FIGS. 4A-C are conceptual renderings of interfaces for managing applications across a variety of computing devices using an application installation platform in accordance with an embodiment of the invention.

Turning now to FIG. 4A, an application platform application executing on a tablet device 400 is conceptually illustrated. In a variety of embodiments, the OEM can select a specific device type, model number, serial number, or however they wish to segment their computing devices. In many embodiments, the OEM can also determine desired countries and/or languages to target specific applications. The application platform application can be further configured with respect to the applications that appear when a device first powers on, e.g. a dynamic preload of applications as described above. In a number of embodiments, the applications that appear are an available catalog of applications based on the filtering options set by the OEM. These applications can come from a variety of sources, such as the OEM's catalog of deals they have done with developers and/or applications provided through the application installation platform. For example, tax-related applications can be promoted during tax season. Without the application installation platform, OEMs would have to hard-bundle a generic collection of applications 6+ months in advance during the manufacturing process. The application installation platform allows the OEMS to dynamically control their preinstalled content and dramatically reduce the time, cost, while also increasing the flexibility in loading applications on the computing devices. This fundamentally change the way OEMs can deliver content on their devices, but also ends up in a better user experience as more timely and relevant applications can be delivered to the right users.

Figure 4B:
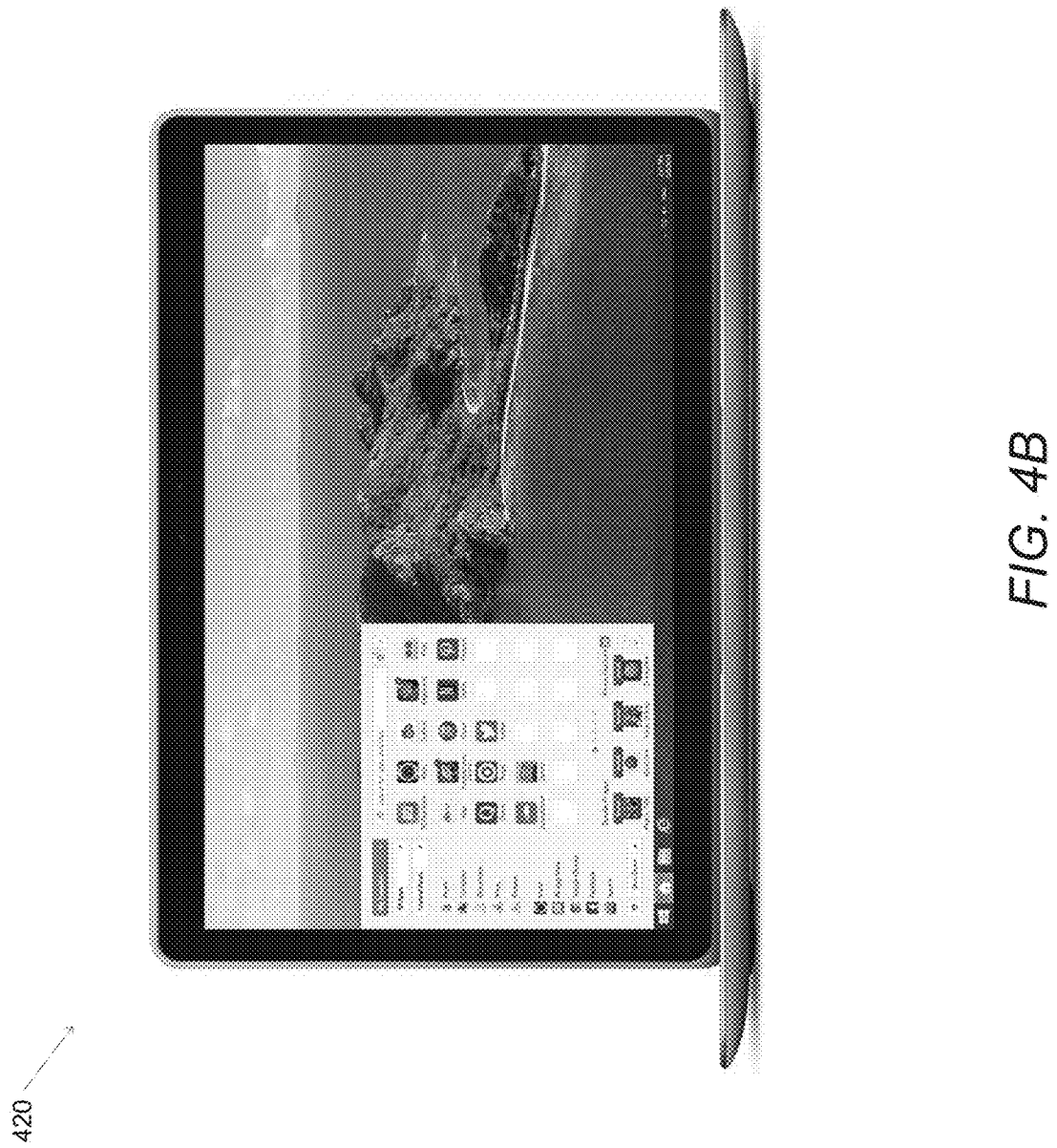

Additionally, the application installation platform provides OEMs a way to complement or even replace the preload model by dynamically offering applications during first boot as well as over the lifetime of the device. The application installation platform can provide a variety of techniques to present touchpoints to the users to browse and install applications, such as consumer-facing touchpoints and/or a SDK to plug into any consumer-facing touchpoint that can display application install ads, including white-label widgets, and other applications like launchers. OEMs can use our touchpoints, their own touchpoints, or, in the future, even plug into third party touchpoints from developers. A variety of categories of applications can be presented to the user. A large portion of application installs happen on brand new devices. This opens up an opportunity for the OEMs to capitalize on this initial application install burst by recommending the right applications for a new device. Application platform applications can recommend applications over the lifetime of the device. Turning now to FIG. 4B, an application platform application executing on a personal computer 420 is conceptually illustrated. In the illustrated embodiment, the illustrated computing device has a variety of applications previously installed using an application platform application.

Figure 4C:
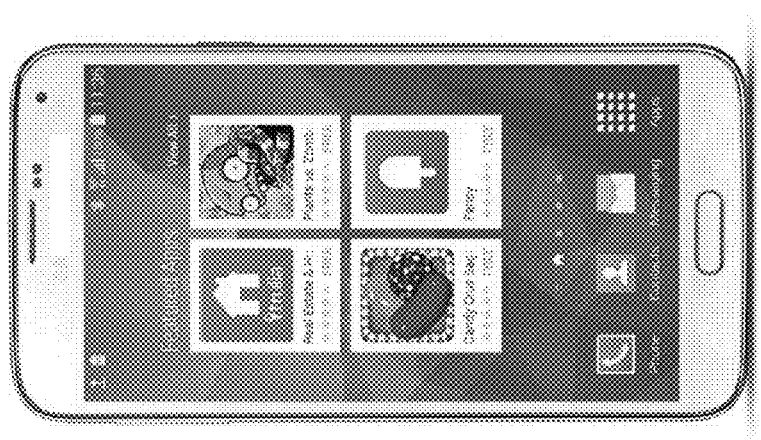

The application installation platform can optimize the applications that ultimately appear in the widget. This optimization can be based on those applications that resonate with users, device characteristics (e.g. device form factor, model, specs), user characteristics (e.g. geography, language, time), and/or (anonymous) application install behavior. Based on the optimizations, applications can be targeted and delivery of those applications can be improved. For example, if we know that a computing device has at 10-inch screen, is located in the US, and is being used in landscape mode at 9 pm, the application installation platform can recommend entertainment applications like Netflix as the recorded performance data indicates that applications utilized to consume video content have a high degree of user engagement in those conditions. With more targeted and relevant application install ads, user satisfaction, and thus conversion improves and OEMs make more money utilizing the application installation platform. Turning now to FIG. 4C, an example of an application platform application presenting application recommendations to a user of a computing device that have been optimized based on recorded application performance metrics 440 in accordance with an embodiment of the invention is conceptually illustrated.

Figure 5:
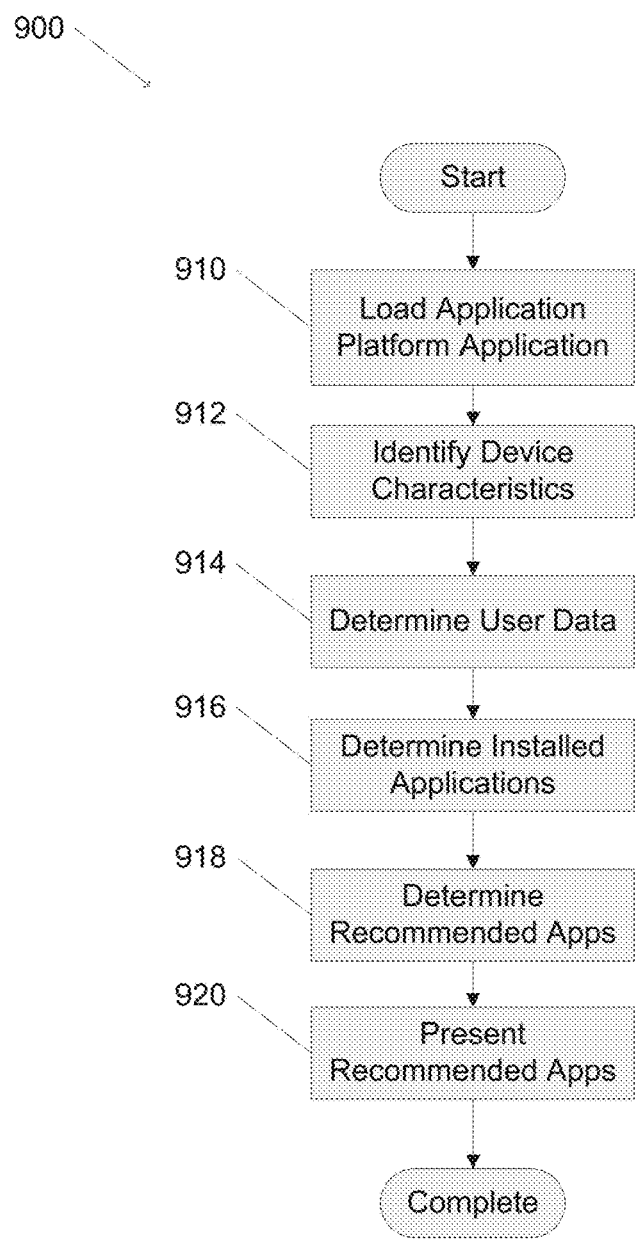
FIG. 5 is a flowchart illustrating a process for presenting application recommendations in accordance with an embodiment of the invention.

Turning now to FIG. 5, a process for presenting applications via an application installation platform in accordance with an embodiment of the invention is illustrated. The process 900 includes loading (910) the application platform application on one or more computing devices. Computing device characteristics are identified (912), user data is determined (914), and/or installed applications are determined (916). As described above, user data can include any demographic information related to the user of a computing device, computing device characteristics include any properties of the hardware and/or software included in the computing device, and installed applications include any applications installed on the computing device, including applications installed via the application installation platform or outside of the application installation platform. Any other data can be utilized as appropriate to the requirements of specific applications of embodiments of the invention. Recommended applications are determined (918) and presented (920) on the computing device. In a variety of embodiments, metadata associated with the recommended applications is utilized to control the rendered display of the applications. This metadata can include, but is not limited to, icon data, image data, video data, audio data, text data describing the application (e.g. title, description, reviews, etc. . . . ), the time and/or date the application is being recommended, version data, and any other data as appropriate to the requirements of specific applications of embodiments of the invention.

Once one or more applications have been identified to install on a computing device, the applications must then be actually installed. In many embodiments, computing devices do not allow for application data to be installed outside of an officially sanctioned marketplace provided by the operating system of the computing device. In several embodiments, applications can be installed outside of the officially sanctioned marketplace only if the user takes several steps to disable security measures in place to prevent such installations; these steps are often cumbersome and outside the abilities of the average computing device user. Application installation platforms in accordance with embodiments of the invention utilize OEM-specific installation keys, often times provided by the entity providing the operating system of the computing device, that allow applications to be installed outside of the sanctioned marketplace. This allows users to seamlessly install applications using the application platform application. In a variety of embodiments, the installed applications can be automatically maintained and updated using the officially sanctioned marketplace. In many embodiments, metadata including tracking data associated with each application is used to track the installation and/or update of the applications.

Figure 6:
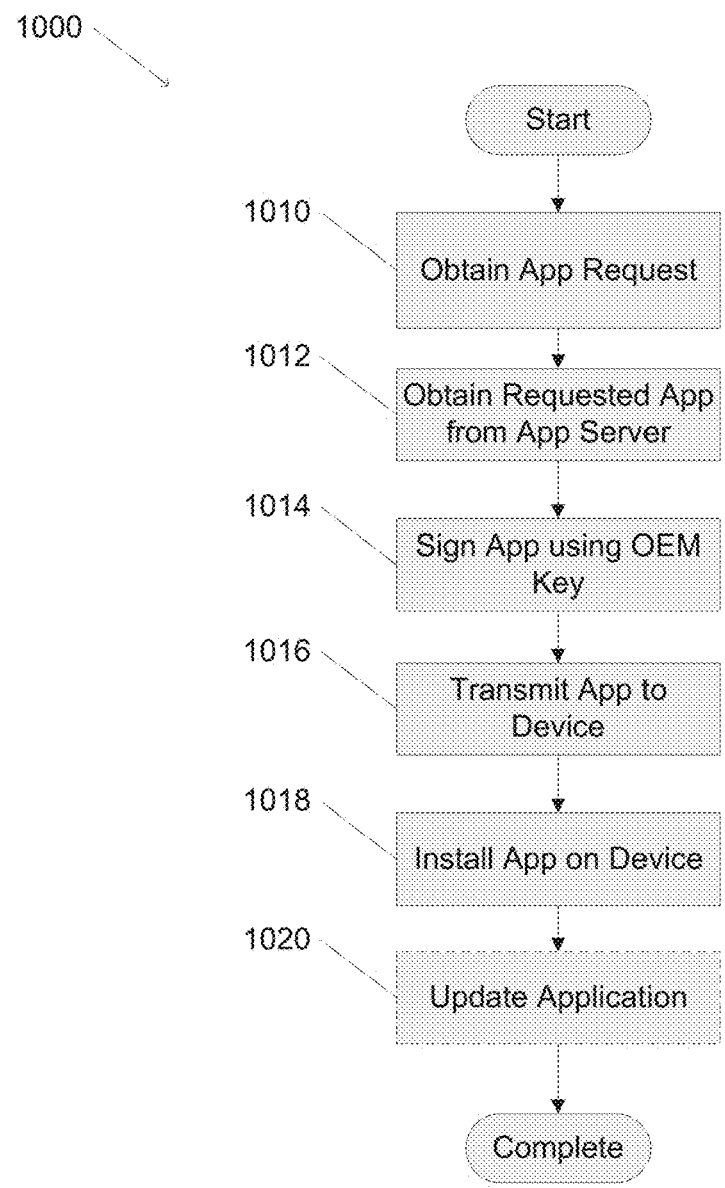
FIG. 6 is a flowchart illustrating a process for installing and updating applications provided via an application installation platform in accordance with an embodiment of the invention.

Turning now to FIG. 6, a process for installing and updating an application using an application installation platform in accordance with an embodiment of the invention is illustrated. The process 1000 includes obtaining (1010) an application request and obtaining (1012) the requested application from an application server. The application server can be hosted by the OEM and/or a third party. The requested application is signed (1014) using the OEM's key and the signed application is transmitted (1016) to a computing device. The application is installed (1018) on the computing device and, in a number of embodiments, the application is updated (1020). As described above, this update can be performed using the application installation platform and/or a using a third-party service, such as an officially sanctioned marketplace.

Although specific processes for recommending and installing application data on a computing device in accordance with embodiments of the invention are described above with respect to FIGS. 5 and 6, any number of processes, including those that provide application data directly without an installer, can be utilized as appropriate to the requirements of a specific application in accordance with embodiments of the invention.

Managing Pre-Loaded Application Data

Figure 7A:
FIGS. 7A-C are conceptual renderings of interfaces for managing application installer data that can be presented using a computing device in accordance with an embodiment of the invention.
Figure 7B:
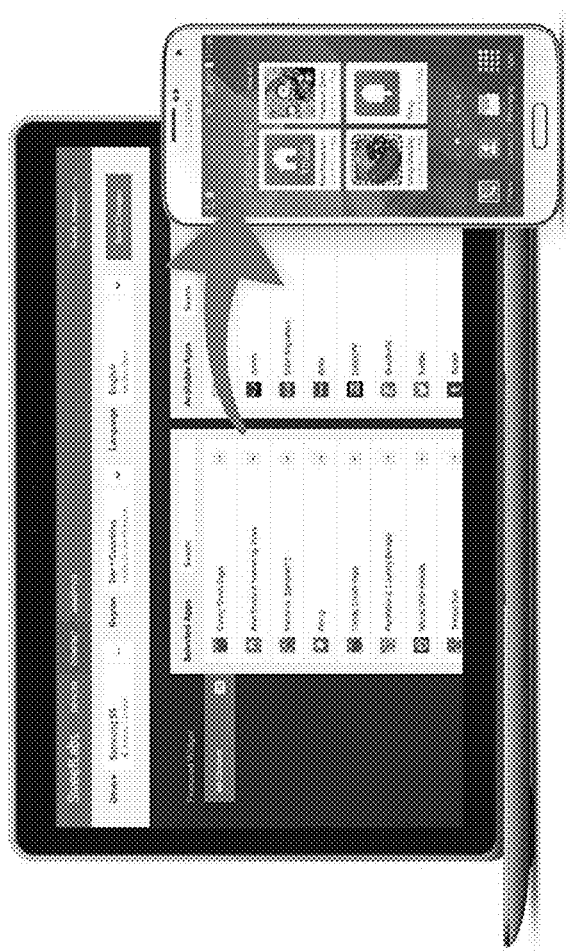

In a variety of embodiments, application installations can be managed and coordinated across a variety of computing devices. In this way, the application installation platform can identify the appropriate version of an application for each computing device so that the user experience is optimized based on the properties of each particular computing device. Turning now to FIG. 7A, an application installed on a personal computer being additionally installed on a tablet device 700 in accordance with an embodiment of the invention is conceptually illustrated. Additionally, applications that a user has expressed an interest in can be automatically distributed to all of a particular user's computing devices, providing the user with a unified experience across devices. Turning to FIG. 7B, the management of applications installed on a mobile phone being controlled by a listing of applications installed on a personal computer 720 in accordance with an embodiment of the invention is conceptually illustrated. In this way, application platform applications promote applications through multiple customer-facing touchpoints, including white-label applications and widgets that integrate into the out-of-box experience as well throughout the lifetime of a device.

Figure 7C:
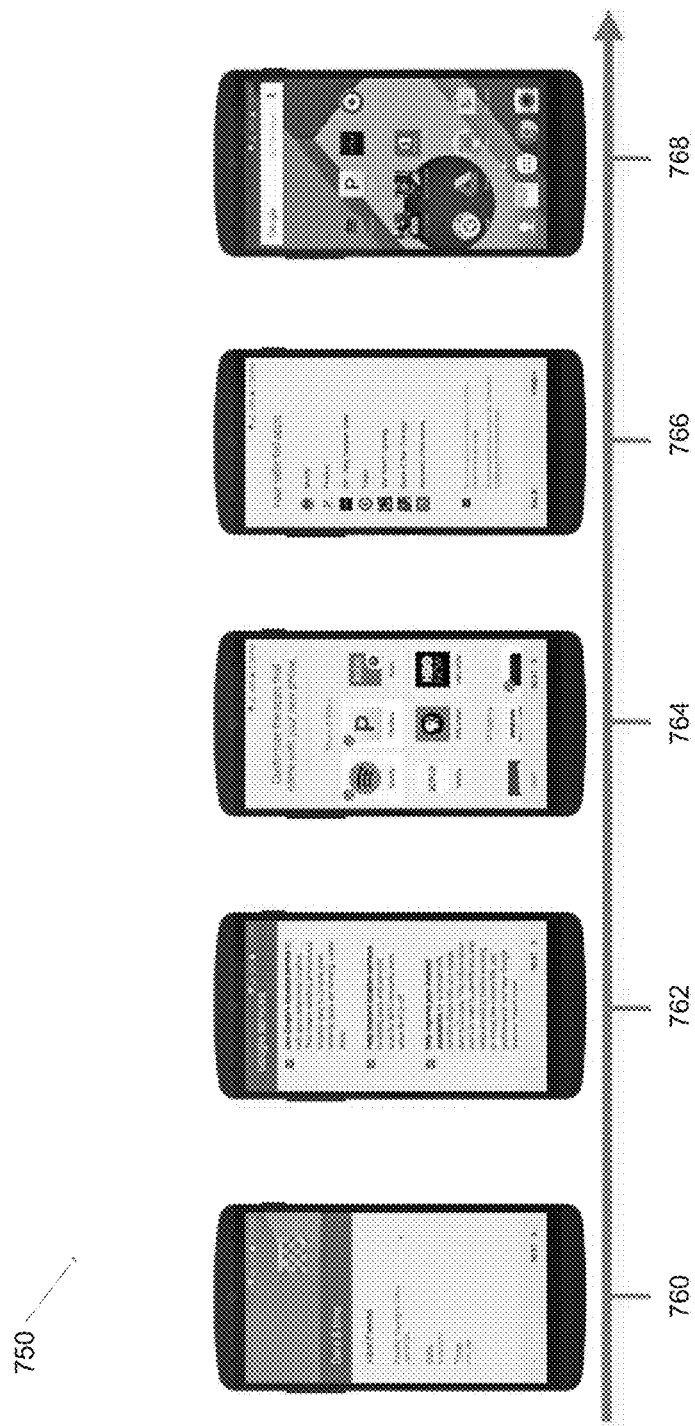

As described above, application data can be installed on a computing device, including during the first boot of the device. In accordance with embodiments of the invention, pre-loaded application data is often installed on the first boot (or first initialization) of the computing device to ensure that the latest application data is installed. In this way, the usefulness of the application data to both the user of the computing device and the OEM providing the computing device can be improved. Turning now to FIG. 7C, a process for initializing a device and determining application data to be installed during the first boot of a computing device is shown. The process 750 includes starting (760) the computing device initialization process. Stock processes can be initialized (762) and pre-load application data can be selected (764). In many embodiments, additional application recommendation data is displayed (766) and the selected applications can be installed (768). In a variety of embodiments, metadata associated with the application data can be utilized to control how the pre-load application data is displayed as described above.

Although specific processes for installing pre-load application data on a computing device in accordance with embodiments of the invention are shown and described above with respect to FIGS. 7A-C, any number of processes, including those that provide application data directly without an installer, can be utilized as appropriate to the requirements of a specific application in accordance with embodiments of the invention.

Advertising

As described above, a variety of advertising data can be provided within an application platform application and/or within the applications installed via an application platform application. In many embodiments, advertising servers and/or platform management server systems within an application installation platform provide advertising data and/or transaction processing capabilities. In this way, applications distributed via the application installation platform can be readily monetized, thereby incentivizing application developers to publish their applications via the application installation platform, OEMs to provide the application platform application on their computing devices, and advertisers to provide campaign data. In several embodiments, campaign data includes one or more advertising creatives that can be displayed within an application. The campaign data can also be utilized to generate specific application recommendation data recommending particular applications to be displayed using an application platform application as described in more detail above. Similarly, the application data for applications providing microtransactions can be written and/or modified to use the transaction services provided within the application install platform. In this way, the revenue generated within the application installation platform can be captured and distributed according to the appropriate revenue sharing agreements.

The advertising data provided to a particular (class of) computing device can be customized based on fingerprint data and/or capability data describing the computing device, user preference data, location data, time data, and/or any of a variety of data as described in more detail above as appropriate to the requirements of specific applications of embodiments of the invention. Once the advertising data (i.e. application recommendations) has been presented and one or more applications have be selected for installation, the application data and/or application installer data for the selected application can be prepared and provided to a computing device as described above. The engagement with the displayed advertising and/or the microtransaction opportunities within the applications themselves can be measured and utilized to determine the revenue generated for a particular recommendation and/or application. Additionally, the engagement data can be utilized to determine the particular revenue share depending on the specifics of the engagement described in the engagement, such as location, time, duration, computing device, and any other data as appropriate to the requirements of specific applications of embodiments of the invention.

Figure 8A:
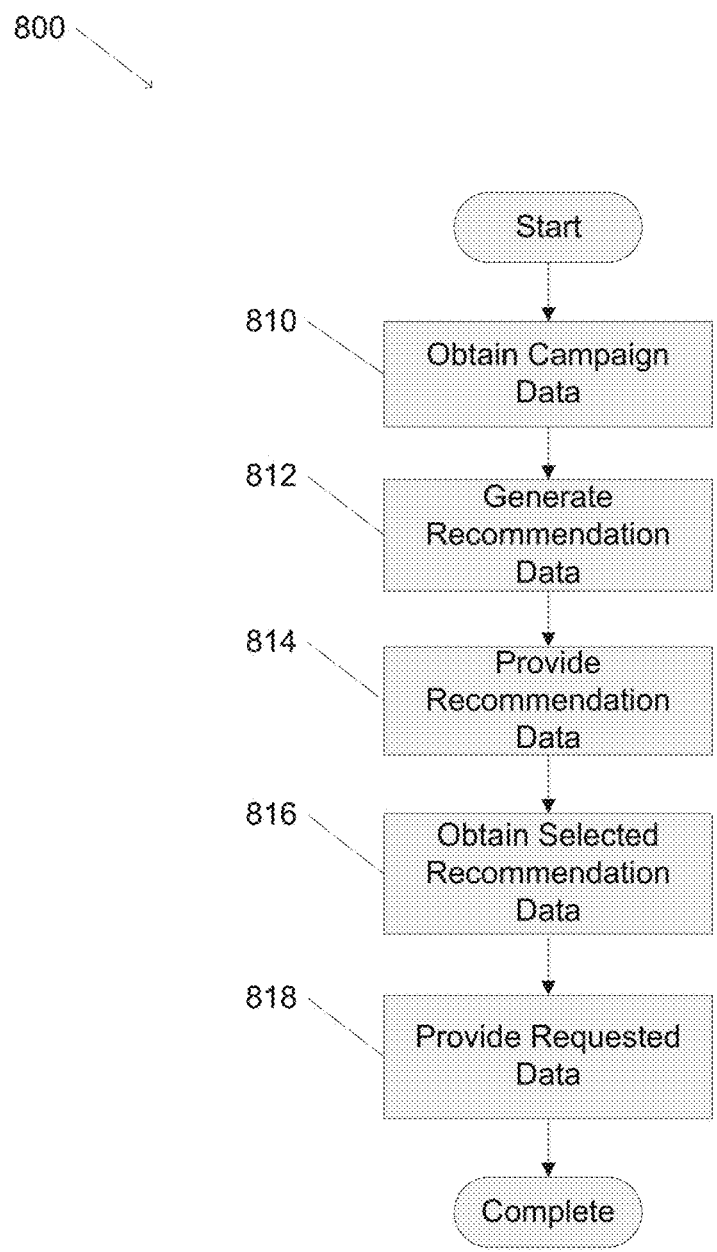
FIGS. 8A-B are flowcharts illustrating processes for obtaining and presenting advertising using an application platform application in accordance with an embodiment of the invention.
Figure 8B:
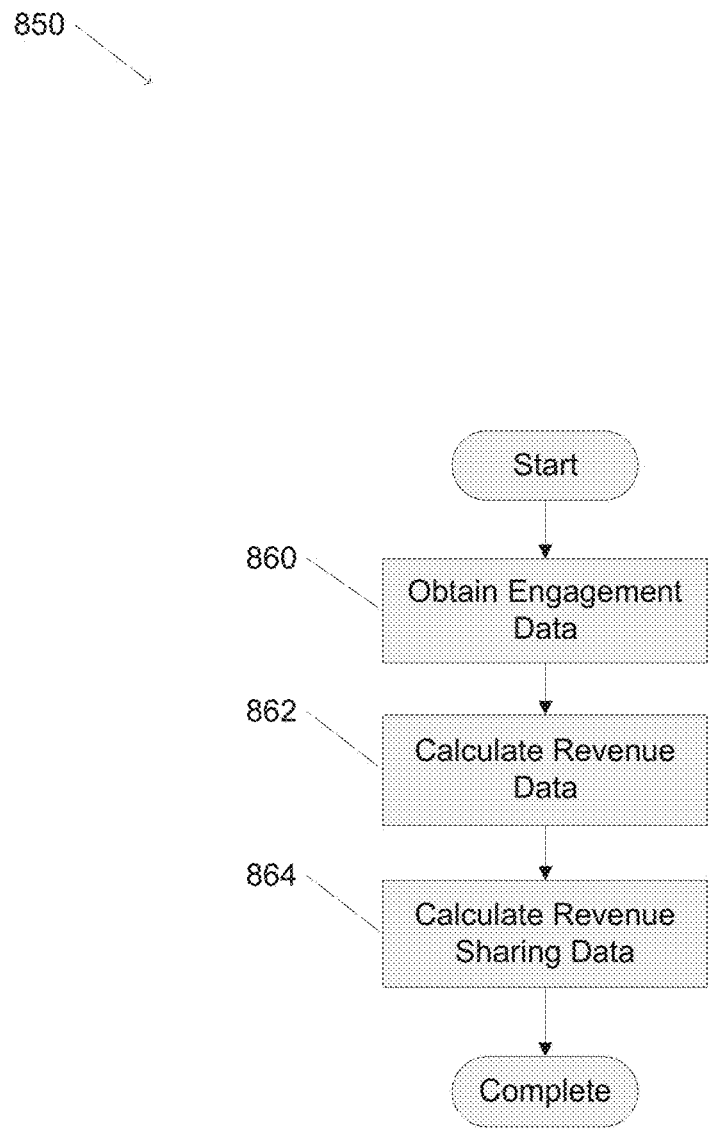

Turning now to FIG. 8A, a process for developing advertising inventory in accordance with an embodiment of the invention is shown. The process 800 includes obtaining (810) campaign data, generating (312) recommendation data, and providing (814) recommendation data. Selected recommendation data can be obtained (816) and the requested data can be provided (818). Turning now to FIG. 8B, a process for obtaining engagement and revenue sharing in accordance with an embodiment of the invention is shown. The process 850 includes obtaining (360) engagement data, calculating (862) revenue data, and calculating (864) revenue sharing data.

Although specific processes for providing advertising data and revenue sharing in accordance with embodiments of the invention are shown and described above with respect to FIGS. 8A and 8B, any number of processes, including those that coordinate with third-party systems to obtain advertising data and/or process transactions, can be utilized as appropriate to the requirements of a specific application in accordance with embodiments of the invention.

Device Analytics

Figure 9:
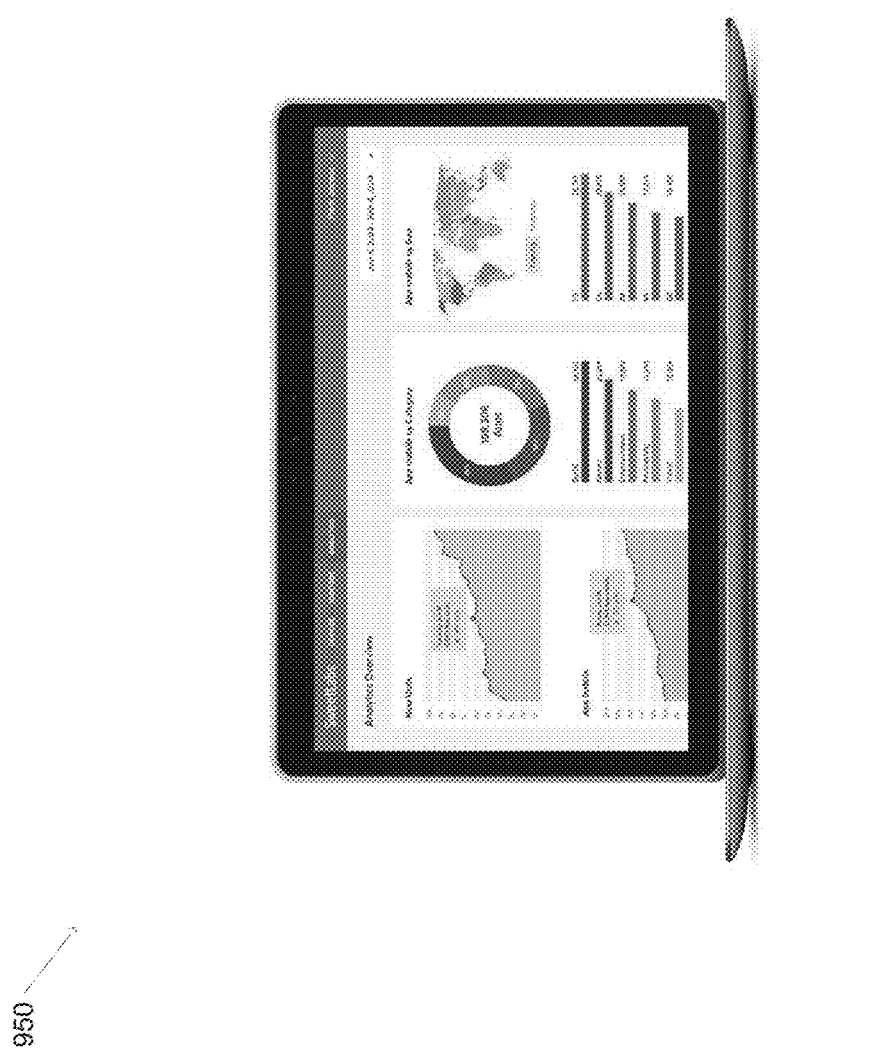
FIG. 9 is a conceptual rendering of an interface for measuring and viewing performance metrics for one or more applications distributed using an application installation platform in accordance with an embodiment of the invention.

With the right data, insight and intelligence, application installation platforms can optimize the delivery of applications to the right users on the right devices by measuring application and computing device performance metrics down to the specific device SKU. As described above, application installation platforms track and provide access to a variety of metrics associated with the presentation, installation, and/or usage of applications. In a number of embodiments, the application installation platform provides a reporting console that displays real-time analytics to help measure and report on application install ad performance, application usage, and computing device insights. Turning now to FIG. 9, an analytics interface 950 displaying a variety of usage metrics recorded during the presentation, installation, and usage of applications within the application installation platform in accordance with an embodiment of the invention is conceptually illustrated. The analytics interface can provide a feedback loop so that OEMs can learn and make informed decisions about their business and customers. In several embodiments, application analytics provide data regarding what applications resonate most with the users of the computing devices, what content (i.e. application data) to preload and recommend on which computing devices, and how computing device characteristics influences application engagement. In many embodiments, device analytics track end-to-end channel metrics to provide data regarding when and where computing devices are activated along with measuring performance of marketing programs, retailer performance, and any other metrics. In many embodiments, the analytics data is based on metadata and/or tracking data associated with the installed applications across one or more computing devices.

Although the present invention has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. It will be evident to the person skilled in the art to freely combine several or all of the embodiments discussed here as deemed suitable for a specific application of the invention. Throughout this disclosure, terms like "advantageous", "exemplary" or "preferred" indicate elements or dimensions which are particularly suitable (but not essential) to the invention or an embodiment thereof, and may be modified wherever deemed suitable by the skilled person, except where expressly required. Accordingly, the scope of the invention should be determined not by the embodiments illustrated, but by the appended claims and their equivalents.

What is claimed is:

1. A system, comprising:
a processor; and
a memory readable by the processor and storing instructions;
wherein the instructions, when read by the processor, direct the processor to:
obtain device data from a computing device, wherein the device data identifies a computing device and comprises metadata describes the characteristics of the computing device;
calculate fingerprint data based on the obtained device data, where the fingerprint data identifies the computing device;
generate application marketplace data based on the obtained device data and the fingerprint data, wherein the application marketplace data comprises metadata describing at least one application installer;
provide the application marketplace data to the computing device;
obtain selected application data from the computing device;
generate application installer data based on the device data and the selected application data by signing application data identified by the selected application data using OEM key data; and
provide the application installer data to the computing device.

2. The system of claim 1, wherein the metadata describing the characteristics of the computing device describes characteristics selected from the group consisting of demographic information related to the user of the computing device, the hardware capabilities of the computing device, operating system software installed on the computing device, and applications installed on the computing device.

3. The system of claim 1, wherein the application marketplace data is utilized by the computing device to generate at least one touchpoint for browsing the application marketplace data.

4. The system of claim 3, wherein at least one of the at least one generated touchpoints comprises advertising data.

5. The system of claim 4, wherein the advertising data is provided by a third-party advertising server system.

6. The system of claim 1, wherein:
the device data further comprises a timestamp identifying when the device data was provided; and
the instructions further direct the processor to optimize the application marketplace data based on the timestamp.

7. The system of claim 1, wherein the instructions further direct the processor to generate analytics data based on the obtained device data, the application marketplace data, the selected application data, and the generated application installer data.

8. The system of claim 7, wherein the instructions further direct the processor to provide an interface for displaying the generated analytics data.

9. The system of claim 1, wherein:
an application platform application are installed on the computing device prior to a first boot of the system; and
the application platform application directs the application install platform to install application data using application install data during the first boot of the system.

10. The system of claim 9, wherein the application platform application directs the computing device to display the application marketplace data during the first boot of the computing device.

11. A method for installing applications, comprising:
obtaining device data from a computing device using a system, wherein:
the device data identifies a computing device and comprises metadata describes the characteristics of the computing device; and
the system comprises a processor and a memory connected to the processor;
calculating fingerprint data based on the obtained device data using the system, where the fingerprint data identifies the computing device;
generating application marketplace data based on the obtained device data and the fingerprint data using the system, wherein the application marketplace data comprises metadata describing at least one application installer;
providing the application marketplace data to the computing device using the system;
obtaining selected application data from the computing device using the system;
generating application installer data based on the device data and the selected application data by signing application data identified by the selected application data using OEM key data using the system; and
providing the application installer data to the computing device using the system.

12. The method of claim 11, wherein the metadata describing the characteristics of the computing device describes characteristics selected from the group consisting of demographic information related to the user of the computing device, the hardware capabilities of the computing device, operating system software installed on the computing device, and applications installed on the computing device.

13. The method of claim 11, wherein the application marketplace data is utilized by the computing device to generate at least one touchpoint for browsing the application marketplace data.

14. The method of claim 13, wherein at least one of the at least one generated touchpoints comprises advertising data.

15. The method of claim 14, wherein the advertising data is provided by a third-party advertising server system.

16. The method of claim 11, wherein:
the device data further comprises a timestamp identifying when the device data was provided; and
the instructions further direct the processor to optimize the application marketplace data based on the timestamp.

17. The method of claim 11, wherein the instructions further direct the processor to generate analytics data based on the obtained device data, the application marketplace data, the selected application data, and the generated application installer data.

18. The method of claim 17, wherein the instructions further direct the processor to provide an interface for displaying the generated analytics data.

19. The method of claim 11, wherein:
- an application platform application are installed on the computing device prior to a first boot of the system; and
- the application platform application directs the application install platform to install application data using the application install data during the first boot of the system.

20. The method of claim 19, wherein the application platform application directs the computing device to display the application marketplace data during the first boot of the computing device.

* * * * *